(12) United States Patent  
Godwin

(10) Patent No.: US 9,140,144 B2  
(45) Date of Patent: Sep. 22, 2015

(54) ROTARY GRAVITY ENGINE UTILIZING VOLATILE MATERIAL AND LOW TEMPERATURE HEAT SOURCES

(75) Inventor: Harold Emerson Godwin, Fergus (CA)

(73) Assignee: DYVERGA ENERGY CORPORATION, Waterloo (CA)

( * ) Notice: Subject to any disclaimer, the term of this patent is extended or adjusted under 35 U.S.C. 154(b) by 144 days.

(21) Appl. No.: 13/509,758

(22) PCT Filed: Nov. 15, 2010

(86) PCT No.: PCT/CA2010/001793  
§ 371 (c)(1),  
(2), (4) Date: May 14, 2012

(87) PCT Pub. No.: WO2011/057402  
PCT Pub. Date: May 19, 2011

(65) Prior Publication Data  
US 2013/0000303 A1  Jan. 3, 2013

Related U.S. Application Data

(60) Provisional application No. 61/261,362, filed on Nov. 15, 2009, provisional application No. 61/408,649, filed on Oct. 31, 2010.

(51) Int. Cl.  
*F01K 7/00* (2006.01)  
*F03G 7/10* (2006.01)  
(Continued)

(52) U.S. Cl.  
CPC ............... *F01K 11/04* (2013.01); *F01K 13/02* (2013.01); *F01K 25/10* (2013.01); *F03G 7/10* (2013.01)

(58) Field of Classification Search  
CPC ............. F01K 11/04; F01K 7/00; F03G 3/04; F03G 7/10  
USPC ........... 60/641.6, 516–531, 643–681; 185/27, 185/32, 33; 415/2.1–8  
See application file for complete search history.

(56) References Cited

U.S. PATENT DOCUMENTS 3,150,016 A * 9/1964 Gillette ......................... 148/269  
3,441,482 A  4/1969 Avery  
(Continued)

FOREIGN PATENT DOCUMENTS

| GB | 2 128 258 A | 4/1984 |
|---|---|---|
| WO | WO2011/057402 A1 | 5/2011 |
| WO | WO2012/155246 A1 | 11/2012 |

*Primary Examiner* — Thomas Denion  
*Assistant Examiner* — Laert Dounis  
(74) *Attorney, Agent, or Firm* — Miller Thomson LLP; Tai W. Nahm

(57) ABSTRACT

An engine is configured to extract energy from a heat source as follows. A shaft is adapted to be rotatably coupled to a support and rotatable in a first direction. A plurality of vessels is coupled to and arranged about the shaft. At least a first vessel of the plurality of vessels includes a thermally insulative portion and a thermally conductive portion. A plurality of conduits connects the plurality of vessels together. Each of the plurality of vessels is in communication with at least one other of the plurality of vessels via at least one of the conduits. The plurality of vessels is arranged to allow the thermally conductive portion of the first vessel to encounter the heat source. The thermally conductive portion is capable of transferring heat to at least partially vaporize volatile fluid within the first vessel to cause a mass to at least partially move towards a connected vessel located above the first vessel. This produces a gravitational moment that encourages rotation of the shaft and the plurality of vessels in the first direction.

40 Claims, 18 Drawing Sheets

(51) Int. Cl.
*F01K 11/04* (2006.01)
*F01K 13/02* (2006.01)
*F01K 25/10* (2006.01)

(56) References Cited

U.S. PATENT DOCUMENTS

| | | | |
|---|---|---|---|
| 3,659,416 A * | 5/1972 | Brown | 60/530 |
| 3,984,985 A * | 10/1976 | Lapeyre | 60/641.13 |
| 4,049,300 A * | 9/1977 | Schneider | 290/54 |
| 4,074,534 A * | 2/1978 | Morgan | 60/675 |
| 4,121,420 A * | 10/1978 | Schur | 60/531 |
| 4,203,295 A * | 5/1980 | Siegel | 60/531 |
| 4,333,314 A | 6/1982 | Allen | |
| 4,355,516 A * | 10/1982 | Jones | 60/675 |
| 4,509,329 A | 4/1985 | Breston | |
| 5,285,112 A * | 2/1994 | Mann | 290/44 |
| 6,240,729 B1 * | 6/2001 | Yoo et al. | 60/641.1 |
| 6,575,144 B2 * | 6/2003 | Hellar et al. | 123/491 |
| 7,131,270 B2 * | 11/2006 | Bittner | 60/531 |

\* cited by examiner

| Angle (Degs) | Valve 1 | Valve 2 | Valve 3 |
|---|---|---|---|
| 0 | Open | Close | Close |
| 60 | Close | Close | Open |
| 120 | Close | Open | Close |
| 180 | Open | Close | Close |
| 240 | Close | Close | Open |
| 300 | Close | Open | Close |

| Angle (Degs) | Valve 1 | Valve 2 | Valve 3 |
|---|---|---|---|
| 355 | Open | Close | Close |
| 5 | Close | Close | Close |
| 55 | Close | Close | Open |
| 65 | Close | Close | Close |
| 115 | Close | Open | Close |
| 125 | Close | Close | Close |
| 175 | Open | Close | Close |
| 185 | Close | Close | Close |
| 235 | Close | Close | Open |
| 245 | Close | Close | Close |
| 295 | Close | Open | Close |
| 305 | Close | Close | Close |

Fig. 5

| Angle (Degs) | Valve 1 | Valve 2 | Valve 3 |
|---|---|---|---|
| 0 | Open | Close | Close |
| 60 | Close | Close | Open |
| 120 | Close | Open | Close |
| 175 | Open | Close | Close |
| 235 | Close | Close | Open |
| 295 | Close | Open | Close |

Fig. 6

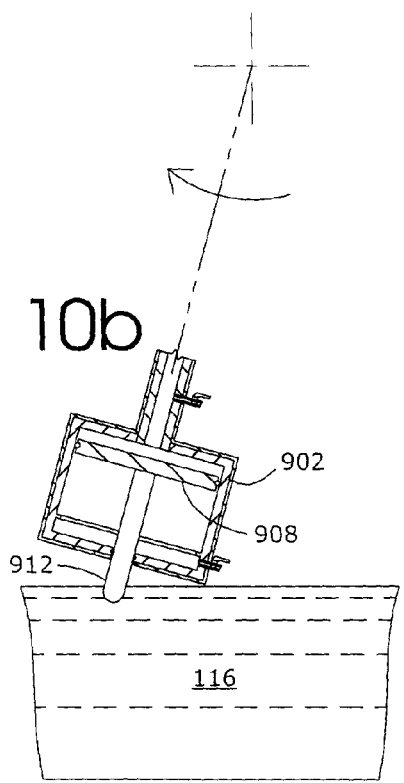
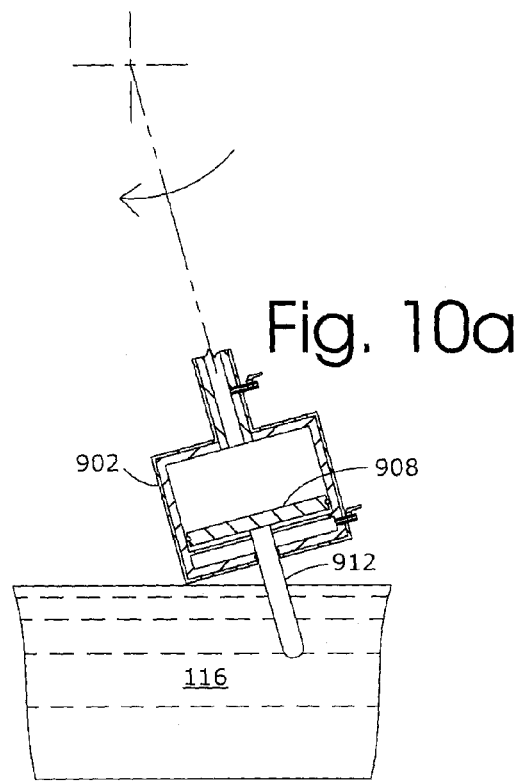
Fig. 10b
Fig. 10a

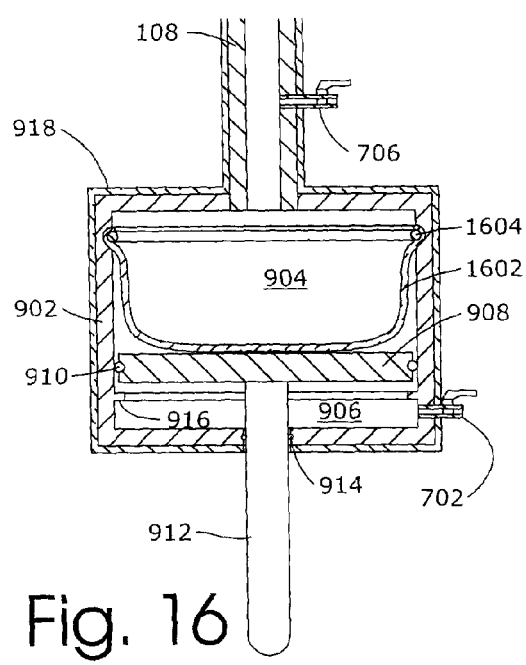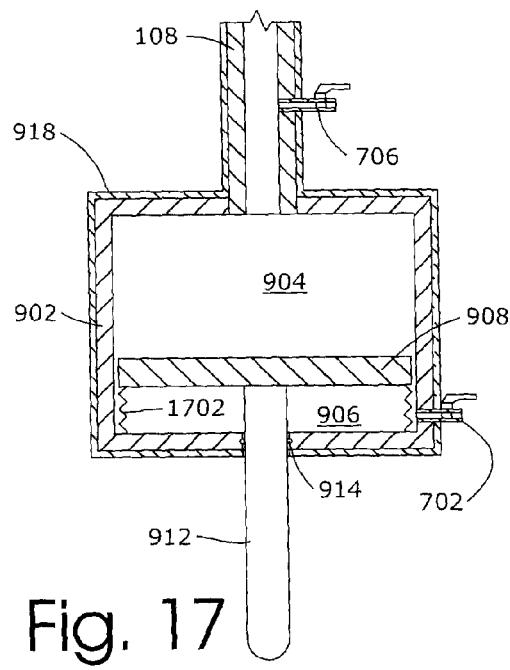

ROTARY GRAVITY ENGINE UTILIZING VOLATILE MATERIAL AND LOW TEMPERATURE HEAT SOURCES

CROSS-REFERENCE TO RELATED APPLICATIONS

This application claims the benefit of U.S. Provisional Application No. 61/261,362 filed Nov. 15, 2009, and U.S. Provisional Application No. 61/408,649 filed Oct. 31, 2010, the entirety of which are incorporated herein by reference.

TECHNICAL FIELD

The embodiments described herein relate to extracting energy from low differential temperature sources, and more specifically, to systems, apparatus, and methods for generating energy from low differential temperature sources.

INTRODUCTION

Extraction of energy from low differential temperature sources, such as water heated by solar, geothermal, or industrial processes, and conversion of this energy to rotational or other forms of energy is often inefficient or impractical.

A number of attempts have been made to provide apparatus that make the energy extraction more practical. For example, Gould (U.S. Pat. No. 4,570,444) describes a solar-powered motor with a wheel-like rotor having a rim separated into hollow compartments. The rotor is designed to revolve around a horizontal axis while containing a volatile liquid in some of its rim compartments. The rotor has a hub, also with separate compartments, and hollow spokes interconnecting the hub with the rim compartments. The interior of the rotor is designed to receive a compressed gas in its hub and sequentially route it, through the hollow spokes, to rim compartments on one side of the rotor axis. When the compressed gas makes contact with the liquid surface in that part of the rim it exerts pressure on that surface. The pressure on the liquid surface forces the liquid to the opposite side of the rotor and into the rim, through an interconnecting series of passageways in the spokes and hub, at a level higher than its original level. This results in an imbalance of weight on one side of the rotor that causes the rotor to turn or rotate under the influence of gravity in a direction tending to restore its weight balance. The rotor continues to rotate as long as the compressed gas is fed into its hub. The compressed gas can be the vapor phase of the volatile liquid in the rotor.

Yoo, et al. (U.S. Pat. No. 6,240,729) on the other hand describes an apparatus for converting thermal energy to mechanical motion including a frame mounted onto an axle above a heat source. A flow circuit including at least three elongate chambers connected by fluid conduits is mounted onto the frame, and one-way valves provided in the flow circuit permit one-way fluid flow within the flow circuit. The heat source heats a motive fluid contained within the chambers beyond its boiling point, which increases the vapor pressure within the heated chamber, thereby forcing fluid out of the chamber and into the chamber immediately downstream in the flow circuit. The increased weight of the downstream chamber creates a torque about the axle, rotating the frame in an upstream direction.

Furthermore, Iske (U.S. Pat. No. 243,909) describes in a motor, a straight tube having a receptacle at each end and allowing the passage of enclosed volatile liquid from one receptacle to the other under the action of heat.

There remains a need for improved apparatus for extracting energy from low differential temperature sources.

SUMMARY

An engine is configured to extract energy from a heat source as follows. A shaft is rotatably coupled to a support and rotatable in a first direction. A plurality of vessels is coupled to and arranged about the shaft. At least a first vessel of the plurality of vessels includes a thermally insulative portion and a thermally conductive portion. A plurality of conduits connects the plurality of vessels together. Each of the plurality of vessels is in communication with at least one other of the plurality of vessels via at least one of the conduits. A volatile fluid is provided in at least the first vessel. The volatile fluid is selected to be at least partially vaporized by the heat source. A mass is provided in at least the first vessel. The plurality of vessels is arranged to allow the thermally conductive portion of the first vessel to encounter the heat source. The thermally conductive portion is capable of transferring heat to at least partially vaporize volatile fluid within the first vessel to cause the mass to at least partially move from the first vessel into a connected vessel located above the first vessel. This produces a gravitational moment that encourages rotation of the shaft and the plurality of vessels in the first direction.

BRIEF DESCRIPTION OF THE DRAWINGS

FIG. 5 is a chart of another program of the controller for controlling the engine;

FIG. 6 is a chart of still another program of the controller for controlling the engine;

FIGS. 10a-b are cross-sectional partial views of an engine having self-regulating vessels according to another embodiment;

FIG. 16 is a cross-sectional view of a vessel according to another embodiment;

FIG. 17 is a cross-sectional view of a vessel according to another embodiment;

DETAILED DESCRIPTION

Figure 1:
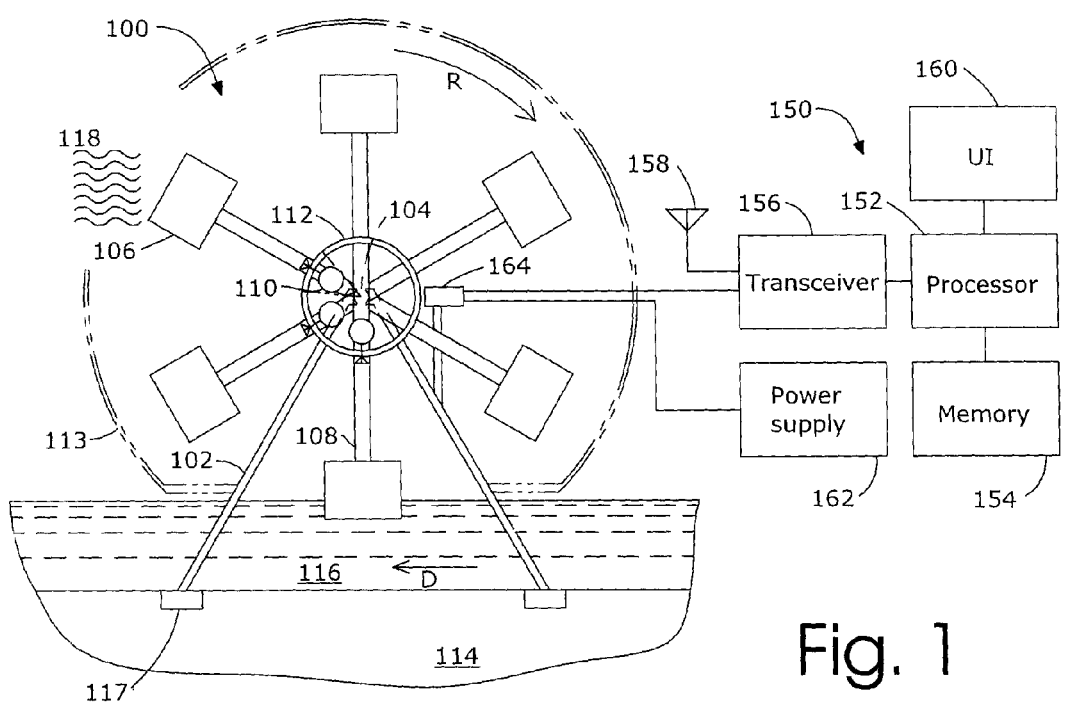
FIG. 1 is a schematic view of an engine configured to extract energy from a heat source according to an embodiment of this disclosure.

FIG. 1 shows a schematic diagram of an engine 100 configured to extract energy from a heat source according to an embodiment of this disclosure. The engine 100 includes a support 102, a shaft 104 rotatably coupled to the support 102, a plurality of vessels 106 arranged about the shaft 104, a plurality of conduits 108 connecting the plurality of vessels 106 together, a plurality of valves 110 situated on the conduits 108, and a drum 112 to which the conduits 108 are fixed. The drum 112 is fixed to the shaft 104 and allows the wheel-like arrangement of vessels 106 and conduits 108 to rotate in a first direction R. A shroud 113 surrounds the arrangement of vessels 106 and conduits 108. The engine 100 includes a controller 150 to control operation of the engine 100.

The support 102 is a frame or similar rigid structure fixed to a base, such as concrete channel 114. The support 102 holds the engine above a heat source 116, which in this case is water flowing in a direction indicated by arrow D. The support 102 includes vibration-dampening feet 117, which can be made of a material such as rubber or elastomer. Other heat sources and base structures are described below.

The shaft 104 is rotatably connected to the support 102. The shaft 104 can be connected to the support 102 by bearings to reduce rotational friction. The bulk of the engine 100 is connected to the shaft 104 and rotates with the shaft 104 in direction R. Such connection can be by rigidly fixing the bulk of the engine to the shaft 104 or by using a unidirectional coupling which allows rotation in only one direction, such as by using an elliptical bearing, for example. Mechanical power can be taken from the shaft 104, and if desired, converted to electricity with the use of a generator.

Each vessel 106 is in communication with at least one other vessel 106 via one of the conduits 108. In this embodiment, pairs of vessels 106 are connected to ends of a conduit 108, thereby allowing communication between pairs of vessels 106 for flow of fluid or other mass. The conduits 108 are angularly offset from each other, so as to form a spoke-like arrangement with vessels 106 along the perimeter. The conduits 108 extend through and are fixed to the drum 112, which is connected to the shaft 104. The assembly of vessels 106, conduits 108, valves 110, the drum 112, and the shaft 104 rotates as a unit about the axis of the shaft 104. As a result, each vessel 106 in turn comes into thermal contact with the heat source 116 and subsequently leaves the heat source 116 to come under the influence of a heat sink 118, such as relatively cool ambient air as illustrated. The engine 100 exploits the temperature difference between the heat source 116 and the heat sink 118 to rotate and thus generate power, as is discussed in more detail below.

In this embodiment, the conduits 108 act as structural elements to hold the vessels 106 in position relative to one another. In other embodiments, separate structural elements (such as structural channel, angle iron, structural tubing, etc) are provided to hold the vessels 106 and the conduits 108 may be reduced in size and act mainly to convey mass.

The shroud 113 (or housing) is connected to the support 102 and includes a generally cylindrical hollow body. The shroud 113 surrounds the moving parts of the engine 100 for safety, and can be designed to safely contain a catastrophic failure by either rigidly containing debris or detached moving parts or by crumpling to absorb kinetic energy of same. In one embodiment, the shroud 113 simply prevents a human operator from getting too close to the moving parts of the engine 100. A box can be mounted to the side of the shroud 113 to contain the controller 150. The shroud 113 can also have openings to allow for movement of air acting as the heat sink 118. The shroud 113 may also have a window to allow for safe observation of the engine 100 by an operator. Examples of materials for making the shroud 113 include a highly deformable metal (such as ARMCO 33) or composite material including Kevlar.

Examples of heat sources 116 include water (or other liquid) warmed by for example industrial or residential processes (e.g. warm waste water), directed and/or focused solar rays, geothermal sources, ocean thermal sources, decomposing biomass, body heat of humans (or other living mammals), heat produced from operation of electronics, and similar sources of heat. Other examples include hot exhaust gases or other gas streams. Examples of heat sinks 118 include ambient air aided or not aided by evaporative cooling effects of water (or other liquid) on the exterior of the vessels 106, cooling fluid piped in from a cooling reservoir, free convection or forced convection (e.g., from movement of the vessels 106 through the air), or some combination of these.

Examples of base structures 114 include stationary bases such as channels, cooling ponds (such as those used by power plants), and metal tanks. Moving bases are also suitable and include vehicles such as ships, barges, railcars, trucks, and cars. Other bases include floating platforms.

Figure 2A:
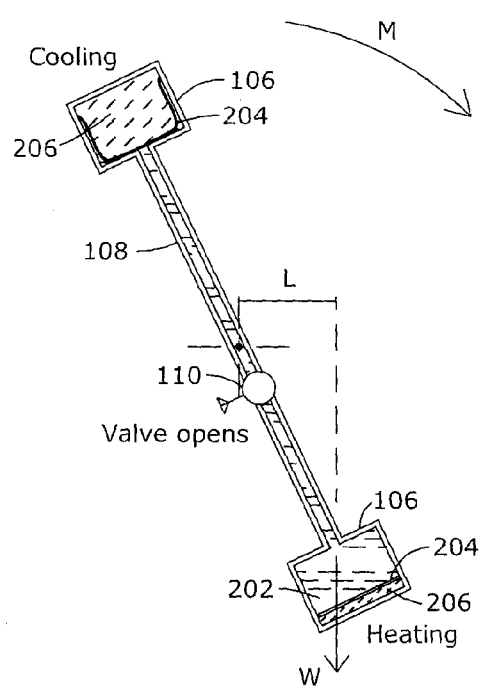
FIGS. 2a-b are cross-sectional diagrams of an isolated conduit and vessel pair in motion.
Figure 2B:
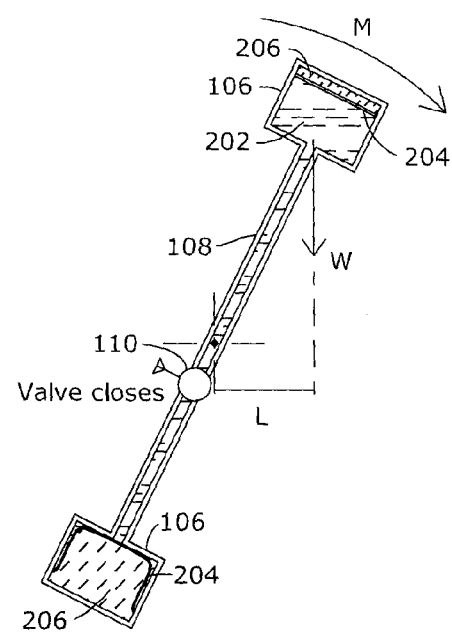

FIGS. 2a-b, show, for illustrative purposes, an isolated conduit 108 and connected vessel pair (i.e. a first vessel 106 and a connected vessel 106), the valve 110 of the conduit 108 can be opened and closed to control movement of mass 202 between the pair of connected vessels 106. In this embodiment, the mass is a fluid contained by each pair of vessels 106 and the interconnecting conduit 108. Each vessel 106 contains a flexible membrane 204 that isolates the mass 202 from a portion of the vessel 106 that contains a volatile material 206.

The membrane 204 is made from a flexible and thermally insulative material, such as silicone rubber or the like. In another embodiment, the membrane 204 is a combination of sealing material, such as silicone rubber, and a thermally insulative fabric made from a ceramic, such as Nextel. In another embodiment, the membrane is molded silicone rubber with a composite mix of ceramic insulative material or other insulative fibres or nodules.

When the volatile material 206 in a particular vessel is heated, at least some of the volatile material 206 vaporizes and expands, pushing on the membrane 204 to deform the membrane 204. The membrane 204 thus pushes on the mass 202, and, when the valve 110 is open, the mass 202 is urged to move from the particular vessel 106 being heated, through the conduit 108, towards and into another, higher vessel 106. The mass of fluid 202 moved towards and into the higher vessel 106 produces a gravitational moment that encourages rotation of the shaft in the first direction (R of FIG. 1).

For example, FIG. 2a shows the center of mass of the conduit and connected vessel pair under the influence of gravity exhibiting a weight W. The weight W is offset from the central axis of the shaft by moment arm L. Thus, the gravitational moment M tends to rotate the engine 100. The rotation of the engine 100 brings the lower vessel 106 into the influence of the heat source 116 which begins to heat the vessel 106 and thus begins to vaporize the volatile material 206. Vapour of the volatile material 206 in the other vessel 106, which is located above the heated vessel, at least partially condenses due to cooling thereby causing a partial vacuum to act on the membrane 204 and assist in pulling the mass of fluid 202 up once the valve 110 is opened.

FIG. 2b shows the conduit and connected vessel pair at a later time during rotation of the engine and after the majority of the mass of fluid 202 has been moved to the upper vessel 106. The above-described cycle repeats for each conduit and connected vessel pair thereby continuously turning the engine. The engine 100 will continue to operate in this matter while the heat source 116 is sufficiently warm and while the volatile in the connected vessels are able to be cooled.

The volatile material 206 is selected to at least partially vaporize at a temperature less than or equal to the temperature of the heat source 116. Examples of volatile materials include alcohol (e.g., ethanol or methanol), ammonia, water, petroleum ether, benzine, pentane-n, diethyl ether, dimethyl ether, methyl acetate, methyl iodide, ether, ethyl bromide, methanol, hexane, acetone, butane-n, carbon disulfide, bromine, chloroform, acetaldehyde, and Freon refrigerants. The volatile material can be provided as a fluid, vapour, or combination of such. It will be appreciated that this list of examples of volatile materials is not exhaustive, and other volatile materials that have suitable vaporization points and that may be safely contained in the vessels 106 in use may also be used.

The mass 202 is selected to provide a sufficient weight W. Examples of masses include liquids; gels; suspensions; colloids; thixotropic pastes; solids such as particulates (e.g., tungsten particulate), sand, ball bearings; and similar flowable materials. Such liquids can include water, oils, iodine, mercury, and other high-density liquids. Solid or particulate flowable materials may have their flowability aided by addition of a liquid or a lubricant, or by being coated with a low-friction coating. This list of examples of masses is not exhaustive, and other suitable masses that have sufficient flowability within the conduits 108 and vessels 106 may also be used.

The conduits 108 and vessels 106 can have their internal surfaces coated with a low-friction coating, such as Teflon, to reduce friction to improve the movement of the mass.

The valve 110 is for restricting movement of the mass 202 and can be any kind of suitable valve, such as a solenoid shut-off valve. Other kinds of valves can be used, such as variable flow valves. In other embodiments, multiple valves are provided for each conduit and connected vessel pair. For example, a valve can be placed at each end of the conduit, near the entrance or exit of the vessel.

Referring back to FIG. 1, the controller 150 is configured to open and close the valves 110. The controller 150 can be configured to detect whether a particular vessel 106 having volatile fluid therein encounters the heat source, and in response open the associated valve 110.

The controller 150 includes a processor 152, a memory 154 connected to the processor 152, a transceiver 156 connected to the processor 152, an antenna 158 connected to the transceiver 156, and a user interface (UI) 160 connected to the processor 152. A bus (not shown) may be provided to connect these components together. A program for controlling the engine 100 is stored in the memory 154. A power supply 162 is provided for powering components of the controller 150 as well as other components of the engine 100 that require electrical power. In some embodiments, the controller 150 can be a computer, such as a desktop computer, notebook computer, server, or the like. In other embodiments, the controller 150 can be a commercially available industrial controller. In still other embodiments, the controller 150 can be a specially made device.

The processor 152 can be micro-processor, central processing unit (CPU), or similar device capable of executing instructions and communicating information between the memory 154, transceiver 156, and UI 160.

The memory 154 can comprise volatile and/or non-volatile memory, such as random-access memory (RAM), read-only memory (ROM), flash memory, erasable programmable read-only memory (EPROM), electrically erasable programmable read-only memory (EEPROM), a hard disk, or the like.

The UI 160 can include input/output devices for an operator to control, monitor, and/or program the controller 150. Such devices can include a monitor, a keyboard, a mouse, a touch-screen, and the like. For example, a monitor of the UI 160 can display various operational conditions such as rotational position, speed, power output, temperatures, and pressures of the engine 100 and its various components.

The transceiver 156 can be a two-way communications device such as a wired and/or wireless network adaptor. In this embodiment, the transceiver 156 supports both wired and wireless communications modes. Wireless communication can be via protocols such as IEEE 802.11 or Bluetooth. In other embodiments, a different transceiver for each of the wired and wireless modes is provided. The antenna 158 is provided to allow wireless communication by the transceiver 156. The transceiver 156 can be further linked to the Internet or an intranet for remotely monitoring and/or remotely controlling power output and performance of the engine 100. When the controller 150 is provided with a global positioning system (GPS) device, this Internet/intranet link can be further used to monitor the location of the engine 100 (such as in the case where the engine 100 is mounted in a vehicle).

In an embodiment, the base structure 114 may be configured to be controllable via controller 150 to set at least one of the position or orientation of engine 100, in order to increase exposure to a suitable heat source 116 and/or corresponding heat sink 118. For example, if the engine 100 is configured to utilize focused solar rays as a heat source, base structure 114 may be controlled automatically, or controlled via remote commands sent to controller 150 in order to increase exposure of engine 100 to solar rays during the course of a day as the sun moves across the sky. In an embodiment in which base structure 114 includes a floating platform, controller 150 may be used to set the position or orientation of engine 100 on the liquid surface. It will be appreciated that base structure 114 may also be controlled independently using a separate controller (not shown) if desired.

The valves 110 have a similar transceiver and antenna for wireless communication with the controller 150. The transceivers and antennas can be same as those from commercially available industrial network systems, such as CAN-bus.

A rotational position detector 164 is provided to measure the rotational position of the rotating part of the engine 100. The rotational position detector 164 is connected to the transceiver 156 by one or more wires. In another embodiment, the rotational position detector 164 is wirelessly connected to the transceiver 156 in the same manner as the valves 110.

The power supply 162 provides power to the valves 110 using a rotational electrical coupling, which is a commercially available device for transferring electrical power and/or signals between a stationary device and a rotating device. In another embodiment, the valves 110 are powered by one or more batteries, which may be rechargeable batteries such as Li-ion, NiMH, or Ni—Cd, disposed near the valves 110 and rotating with the engine, thereby obviating the need to deliver power to the valves 110 by a rotational coupling. The power supply 162 further provides power to the rotational position detector 164. Since the engine 100 generates rotational energy, in other embodiments, the power supply 162 can include an electrical generator for converting some of that rotational energy to electricity to power the power-requiring components of the engine 100 and controller 150. For example, the electricity generated by the rotational energy may be stored in the one or more rechargeable batteries to provide a constant power supply, even when the rotation of the engine 100 is interrupted momentarily, or for a longer duration of time.

Figure 3:
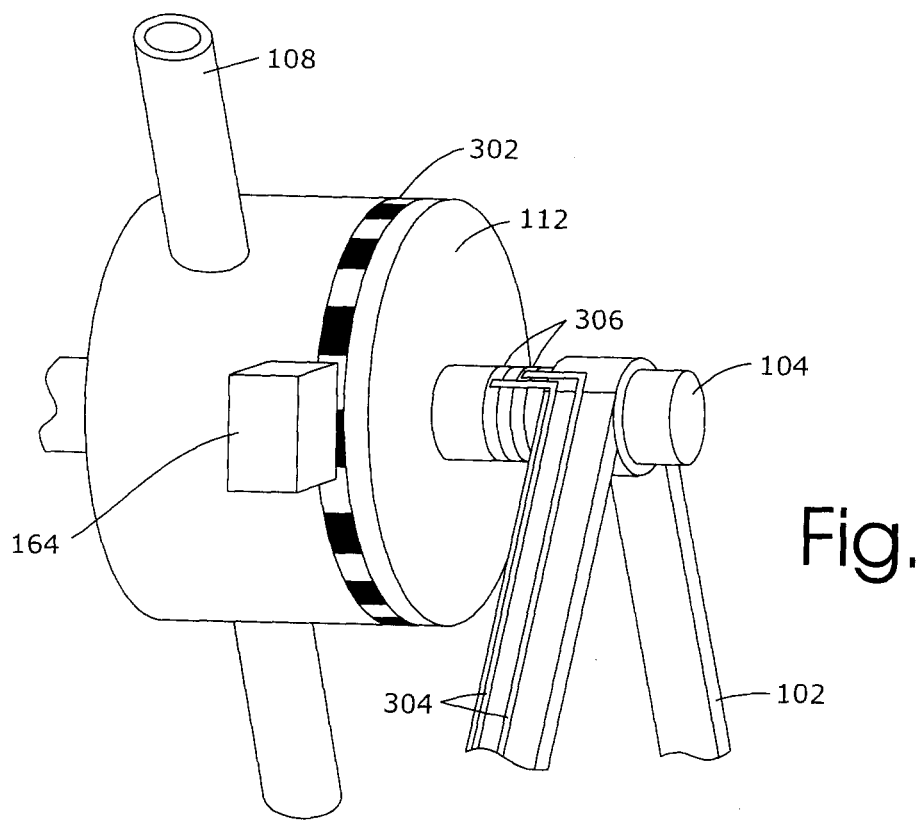
FIG. 3 is a schematic view of the drum and the rotational position detector.

FIG. 3 is a schematic view of the drum 112 and the rotational position detector 164.

In this embodiment, the rotational position detector 164 includes a light source and a photo-detector. The light source, which can be a light emitting diode, shines on a patterned area 302 of the drum 112. The patterned area 302 includes highly reflective portions (e.g., white) and highly light absorbing portions (e.g., black). The photo-detector registers the intensity of light reflecting from the patterned area 302 and compares such to a threshold value. Thus, a count of above-threshold reflections (e.g., white portions) can be used to derive the rotational position of the engine 100, which can be expressed in degrees. In other embodiments, the rotational position detector 164 can include accelerometers, mercury switches, Hall Effect sensors, or a pattern of electrical contacts. When the rotational position detector 164 inherently measures speed, then position can be derived. On the other hand, when the rotational position detector 164 inherently measures position, then speed can be derived, if desired. In another embodiment, the rotational position detector 164 includes a level sensor that the controller 150 uses to compensate for changes in the orientation of the base 114, such as when the base 114 is part of a floating vehicle or structure and subject to wave action.

Also shown in FIG. 3 is a rotational coupling used to provide power to the valves 110. The rotational coupling includes stationary wires 304 the run up the support 102 as well as circumferential contacts 306 fixed to the rotating shaft 104. The ends of the wires 304 adjacent the circumferential contacts 306 also have conductive boots or brushes that are in contact with the circumferential contacts 306, so as to form a complete conductive path despite the continuous rotation of the shaft 104. Wires (not shown) run from the circumferential contacts 306 to the valves 110 (not shown), and wires 304 extend to the power supply 162 (not shown).

Figures 4A, 4B:
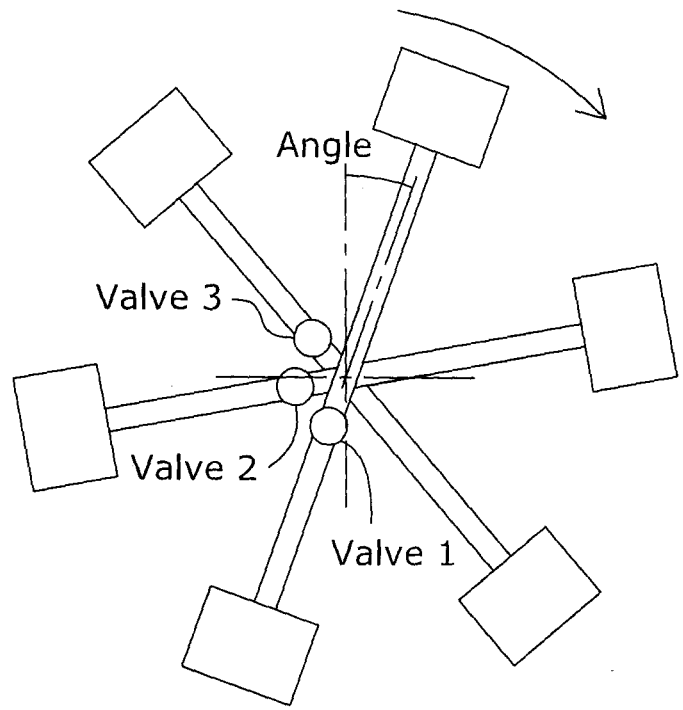
FIG. 4a is a schematic of the rotational part of the engine.
FIG. 4b is a chart of a program of the controller for controlling the engine.

FIG. 4*a* shows a generalized schematic of the rotational part of the engine 100. FIG. 4*b* shows a chart illustrating a program of the controller 150 for controlling the engine 100. The chart can be shown on the UI 160 of the controller 150 for programming and/or monitoring purposes.

The program of FIG. 4*b* can be stored in the memory 154 of the controller 150. The program includes instructions executable by the processor 152. The instructions can be stored in a data file associated with an application program, so that the instructions can be modified without having to modify the application program itself. Alternatively, the instructions can be part of the executable code forming the application program. Other programming techniques can be used.

The program of FIG. 4*b* correlates commanded opening and closing of the valves 110 to rotational position of the engine 100, as measured by the rotational position detector 164. According to this program, every 60 degrees one valve is opened while the other two are closed. Each valve 110 is opened when the target vessel 106 is top dead center, meaning that the vessel containing the mass 202 is directly below and under the influence of the heat source 116. For example, when the rotating part of the engine 100 is at an angle of 60 degrees (i.e. a relative angle of 60 degrees as measured clockwise from the 12 o'clock position), Valve 1 and Valve 2 are closed, while Valve 3 is opened. Thus, mass 202 is propelled from the vessel 106 below Valve 3 to the vessel above Valve 3. In this embodiment, at any given time one of the valves 110 is open.

The overall controlled operation of the engine 100 will now be described with reference to FIGS. 1-3.

The heat source 116 is introduced and volatile material 206 in a nearby vessel 106 begins to vaporize. The processor 152, referencing the program stored in memory 154, opens the valve 110 associated with the vessel 106 as triggered by a signal originating from the rotational position detector 164 and received at the processor 152 via the transceiver 156. The valve 110 is opened by a command sent from the processor 152 to the valve 110 via the transceiver 156 and antenna 158. The opening of the valve 110 allows the volatile material 206 to expand and push the membrane 204, which pushes the mass 202 towards and into the higher vessel 106 at the other end of the conduit 108. At the same time, cooling provided to the higher vessel 106 condenses volatile material therein to pull on the membrane 204 and create a suction effect to pull the mass 202 into the higher vessel 106. The engine 100 is now over-balanced by the higher vessel 106 and thus rotates. The same is repeated for all conduits and connected vessel pairs in turn.

To shut down the engine 100, the controller 150 can be used to command all valves 110 to close. This will prevent mass 202 from moving between vessels 106 and thus the engine 110 will eventually reach a static equilibrium. The controller 150 can further be used to control how much mass 202 ends up in each vessel 106 at shut down, which can ease start up. For example, it may be beneficial to end shut down with mass 202 in three non-adjacent vessels. If the heat source 116 is flowing, then stopping the engine 100 can also be achieved by stopping the flow of the heat source 116 (which is discussed in more detail with respect to FIG. 13).

FIG. 5 shows a chart of another program for controlling the engine 100. In this example, each valve 110 is opened 5 degrees before the target vessel 106 reaches top dead center and closed 5 degrees after the target vessel 106 passes top dead center. Opening a valve 110 before reaching top dead center can give the mass 202 enough time to reach the target vessel 106 so that the resulting potential energy of the target vessel 106 and mass 202 is maximized, i.e., the mass 202 fills the target vessel 106 just as the vessel reaches top dead center. In this embodiment, each valve is opened for 10 degrees.

FIG. 6 shows a chart of still another program for controlling the engine 100. This program illustrates that not all valves 110 have to be opened at the same rotational position. This program is similar to that illustrated in FIG. 4, except that the last three valve openings are commanded 5 degrees earlier than the first three. This is an example of how the engine 100 can transition between different valve timings. More generally, it will be appreciated that the angular positions at which the valve 110 is opened and closed may be varied in response to a number of factors, including for example the flowability of the mass 202, the speed at which the volatile material 206 expands upon exposure to the heat source 116, and the current rotational speed of engine 100. It will also be appreciated that the opening and closing of valves 110 may be used to control the desired rotational speed by opening and closing one or more of the valves 110 at angular positions such that the rotational speed of engine 100 may be slowed to lower than maximum speed if desired. In an embodiment, controller 150 may utilize a feedback loop to adjust the opening and closing of valves 110 in response to rotational speed data received or calculated from rotational position detector 164 and various other sensors measuring temperature and pressure. Such sensors are described in further detail below.

Figure 7:
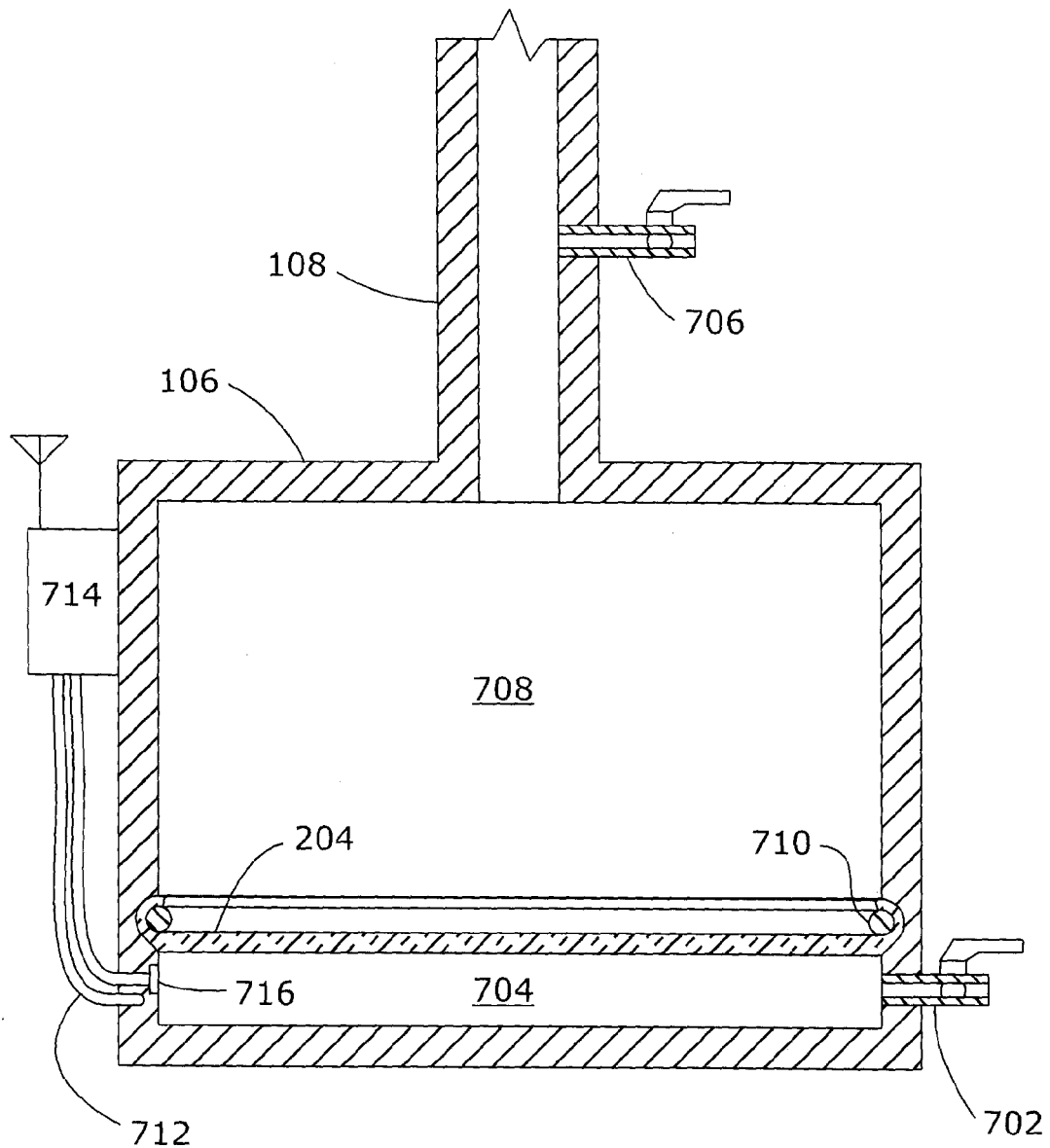
FIG. 7 is a cross-sectional view of a vessel and a portion of the connected conduit.

FIG. 7 shows a close up view of a vessel 106 and a portion of the connected conduit 108.

A valve 702 is provided in the wall of the vessel 106 to allow filling and draining of volatile material in a lower chamber 704. The valve 702 can also be used to establish the vacuum pressure in the lower chamber 704, thereby allowing adjustment of the thermal properties of the volatile material (e.g., lowering the boiling point). Another valve 706 is provided in the wall of the conduit 108 to allow filling and draining of mass in the conduit 108 and upper chambers 708 of the vessels 106. The upper chamber 708 and lower chamber 704 are separated by the membrane 204, which, in this embodiment, is held in place by a snap ring 710 and mating groove on the inside of the vessel wall. In other embodiments, the membrane 204 is bolt-secured into the vessel 106 using flanges or bonded to the vessel 106 wall using thermal bonding techniques or adhesive. One or both of the valves 702, 706 can be controlled by the controller 150 in a similar manner as the valves 110 to automatically control the amount and/or condition of volatile material in the vessels 106. The valves 702, 706 can be located in other positions to allow filling and draining of the respective materials.

In addition, a temperature sensor 712 (such as a thermocouple, thermistor, or resistive temperature device—RTD) can be provided in contact with the wall of the vessel 106 near the lower chamber 704. A temperature signal can thus be sent to the controller 150, via a transceiver and antenna 714 connected to the temperature sensor 712, for the controller 150 to use during operation of the engine 100. For example, the temperature of the volatile material in the lower chamber 704 can be monitored to determine its actual state.

A pressure sensor 716 connected to the transceiver and antenna 714 can be provided to measure the pressure in the lower chamber 704 of the vessel 106. Vessel pressure can be used by the controller 150 to determine whether the volatile material has pressurized enough for it to be desirable to open the valve 110. The program of the controller 150 can therefore use the pressure of the volatile material in the vessels 106 to complement the measured rotational position of the engine 100 to control opening and closing of the valves 110. In another embodiment, the pressure sensors 716 are used instead of the rotational position detector 164, and rotational position of the engine, if desired, can be inferred from pressure measurements. The pressure sensors 716 can also be used to check for leaks of the volatile material.

Figure 8:
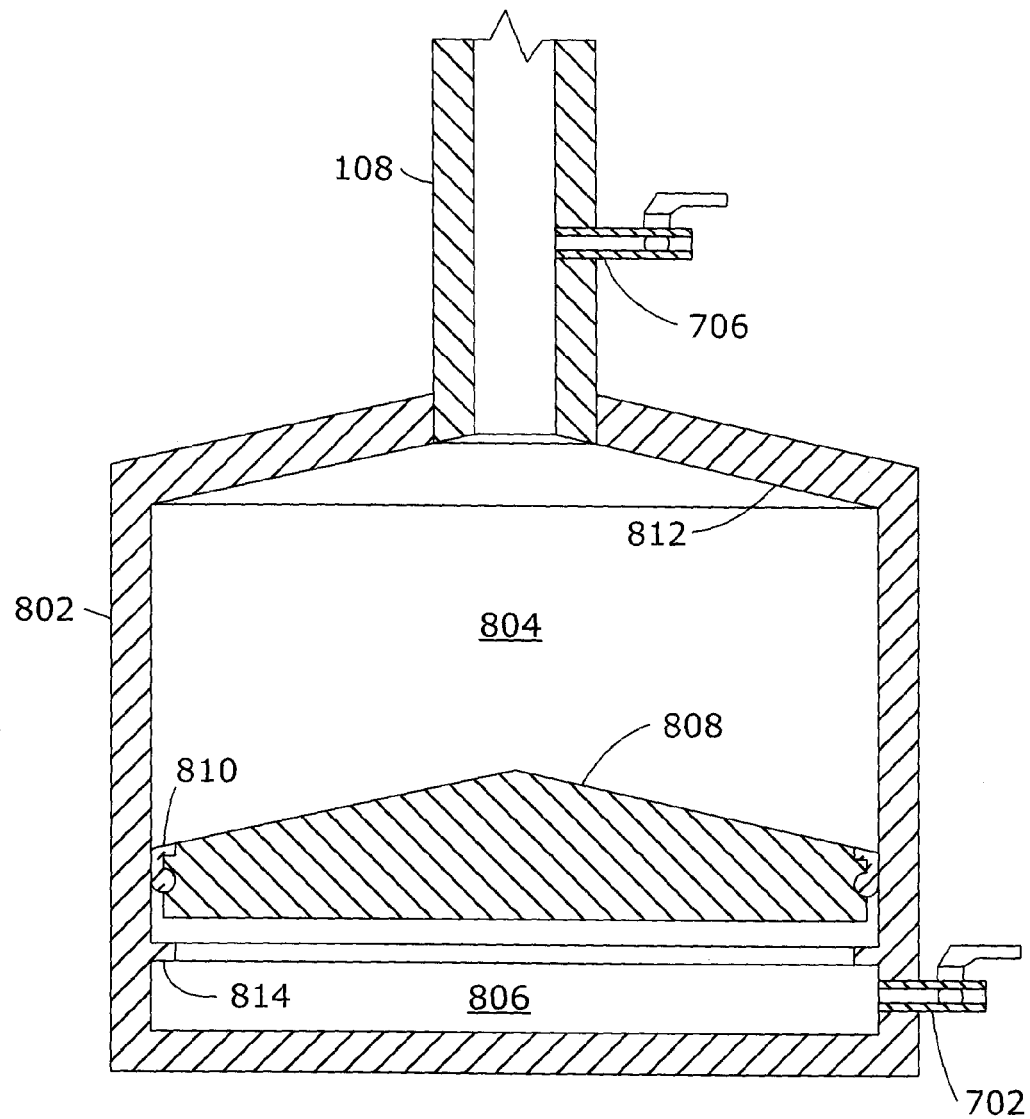
FIG. 8 is a cross-sectional view of a vessel according to another embodiment.

FIG. 8 shows a vessel 802 according to another embodiment.

In this embodiment, the vessel 802 is divided into and upper chamber 804 and a lower chamber 806 by a slidable piston 808. The piston 808 seals to the inner wall of the vessel 802 via a seal 810, such as an o-ring. The upper surface of the piston 808 is conical and a mating surface 812 is provided at the top wall of the vessel 802. When volatile material in the lower chamber 806 is heated, the piston 808 pushes mass in the upper chamber 804 into the conduit 108 and connected vessel 802. The conical shape of the piston 808 and vessel wall 812 can aid mass in exiting the vessel 802 by providing a gradual transition to the relatively narrow conduit 108. This may be particularly useful if the mass is a gel, particulate, solid, or other non-liquid that is being coerced to flow. A lip 814 may be provided to stop the piston 808 from over-compressing the volatile material.

Figure 9:
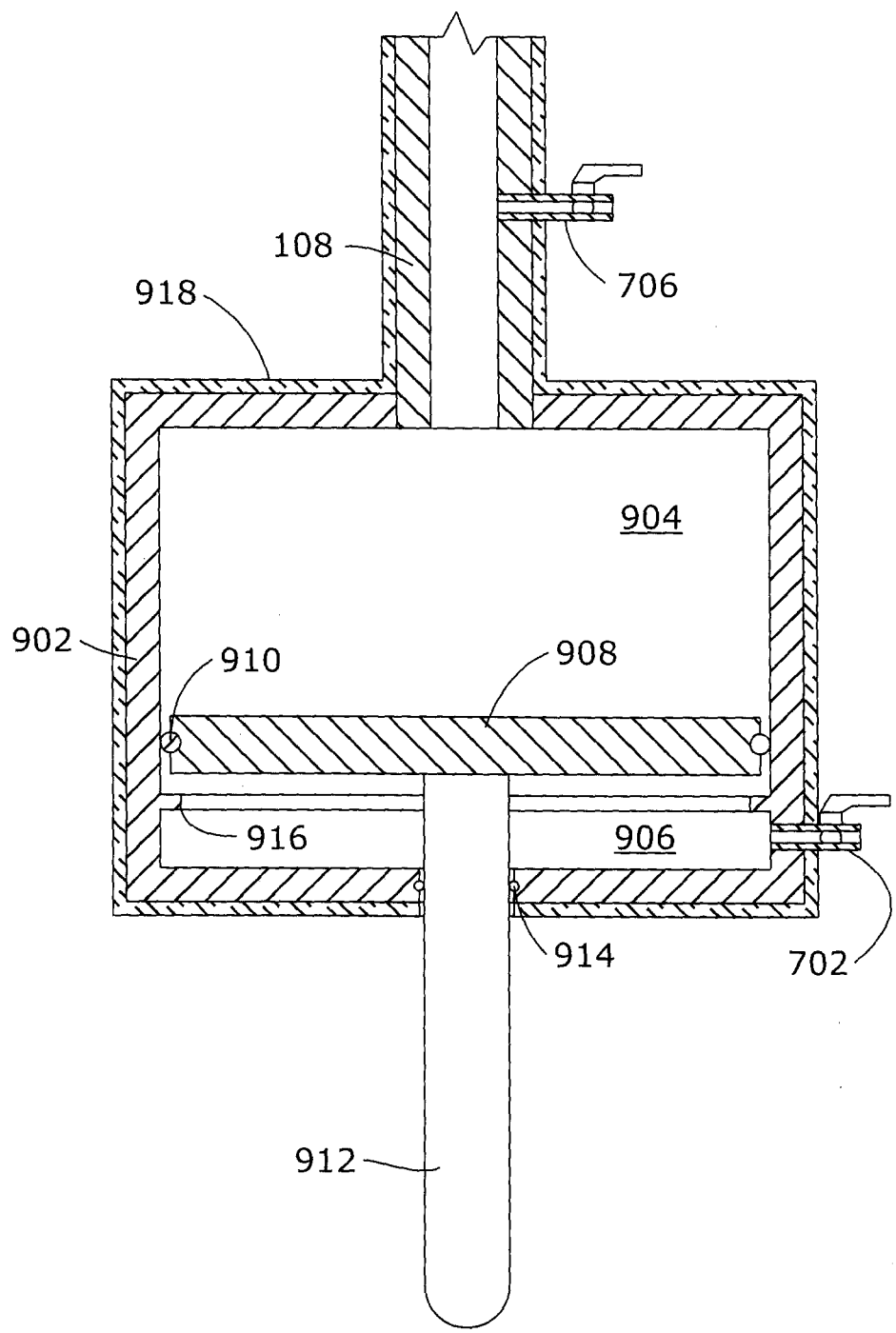
FIG. 9 is a cross-sectional view of a vessel according to another embodiment.

FIG. 9 shows a vessel 902 according to another embodiment.

In this embodiment, the vessel 902 is divided into and upper chamber 904 and a lower chamber 906 by a slidable piston 908. The piston 908 seals to the inner wall of the vessel 902 via a seal 910, such as an o-ring. Extending downwards from the piston 908 is one or more heat transfer devices. In this embodiment, the heat transfer 912 device is a heat pipe. In other embodiments, the heat transfer device can be one or more thermally conductive metal bars or rods. Several parallel heat transfer devices can enhance guiding of the travel of the piston 908 within the vessel 902. The heat pipe 912 is sealed to the vessel 902 by a seal 914, such as an o-ring. A lip 916 may be provided to stop the piston 908 from compressing the volatile material. The vessel 902 and conduit 108 can be made of thermally insulative material, or, as in this embodiment, can be internally or externally coated or covered in an insulating material 918, such as polyurethane foam, silicone rubber, or the like.

FIGS. 10*a-b* show a portion of an engine according to another embodiment having vessel structure as shown in FIG. 9. FIG. 10*a* shows a vessel 902 lowest point in its trajectory, such that the heat pipe 912 (or other heat transfer device) has entered the heat source 116 (i.e., water) and is nearly fully submerged in the heat source 116. Then, as shown in FIG. 10*b*, the heat pipe 912 has transferred some heat to the volatile material in the vessel 902 causing the volatile material to expand and causing the piston 908 to move upwards (towards the center of the engine). As a result of the piston 908 moving, the heat pipe 912 is drawn out of the heat source, which results in a decreasing amount of heat being transferred to the volatile material in the vessel 902. A self-regulating effect is realized, in that the volatile material will not receive more heat from the heat source 116 than it needs to expand and move the piston 908.

Figure 11:
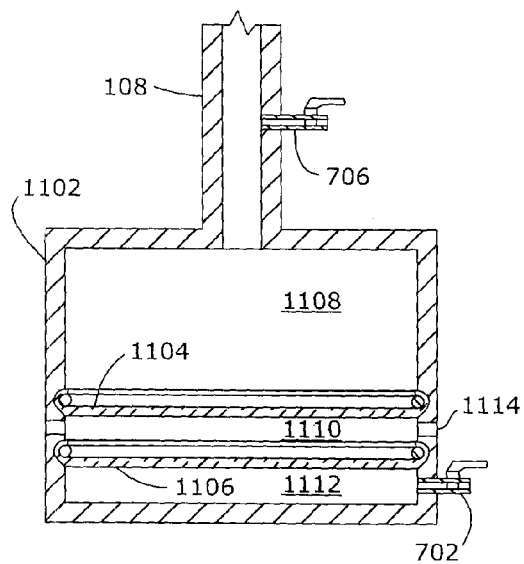
FIG. 11 is a cross-sectional view of a vessel according to another embodiment.

FIG. 11 shows a vessel 1102 according to another embodiment.

Secured within the vessel 1102 are two membranes 1104, 1106, each of which being similar to the membrane 204 described above. The upper membrane 1104 isolates an upper chamber 1108 from a middle chamber 1110. The lower membrane 1106 isolates the middle chamber 1110 from a lower chamber 1112. The upper chamber 1108 contains a mass, such as a liquid, as described above. The lower chamber 1112 contains volatile material, as described above. The middle chamber 1100 is open to ambient air via one or more open vent holes 1114 (that are located to avoid being submerged in the liquid heat source). Expansion of the volatile material in the lower chamber 1112 causes the lower membrane 1106 to press against the upper membrane 1104 and thus urge the mass in the upper chamber 1108 into the target vessel above. However, contraction of the volatile material (e.g., by condensation) only affects the lower membrane 1106 because the membranes are decoupled in this mode by vent holes 1114; that is, the lower membrane 1106 cannot cause the mass to be sucked back into the vessel 1102 because air instead is sucked into the middle chamber 1110 through the vent holes 1114. The movement of the mass is thus coupled to expansion of the volatile material, but is not coupled to contraction of the volatile material.

Figure 12:
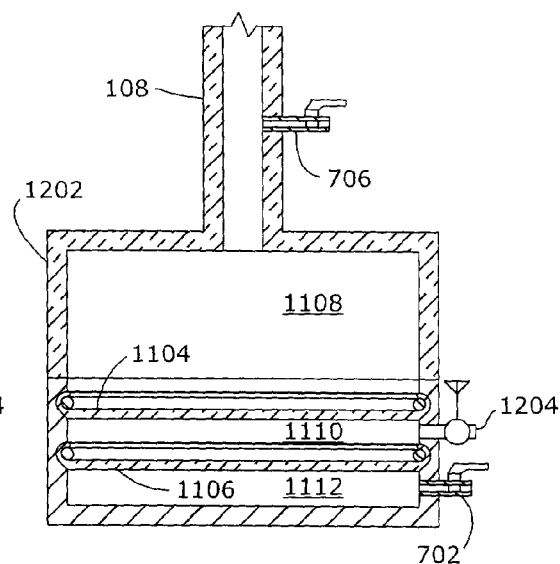
FIG. 12 is a cross-sectional view of a vessel according to another embodiment.

FIG. 12 shows a vessel 1202 according to another embodiment.

The vessel 1202 is similar to the vessel 1102, except that instead of open vent holes, a controllable vent having a valve 1204 is provided to control flow of ambient air into and out of the middle chamber 1110. The valve 1204 includes a transceiver and antenna and can thus be controlled by the controller 150. Another difference is that the vessel 1202 is made of two materials. The material mainly defining the upper chamber 1108 is highly thermally insulative (e.g., plastic, coated metal, etc) to prevent the mass from being unnecessarily heated, while the material mainly defining the lower chamber 1112 is made of highly thermally conductive material (e.g., copper, steel, etc) to allow quick heating and cooling of the volatile material in the lower chamber 1112.

Figure 13A:
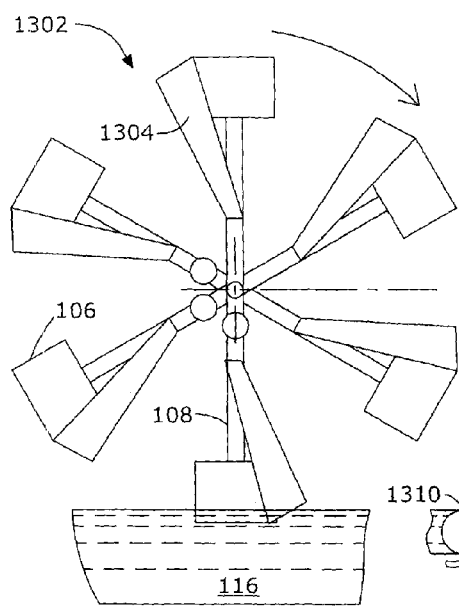
FIG. 13a-b are schematic views of a multi-stage engine according to another embodiment.
Figure 13B:
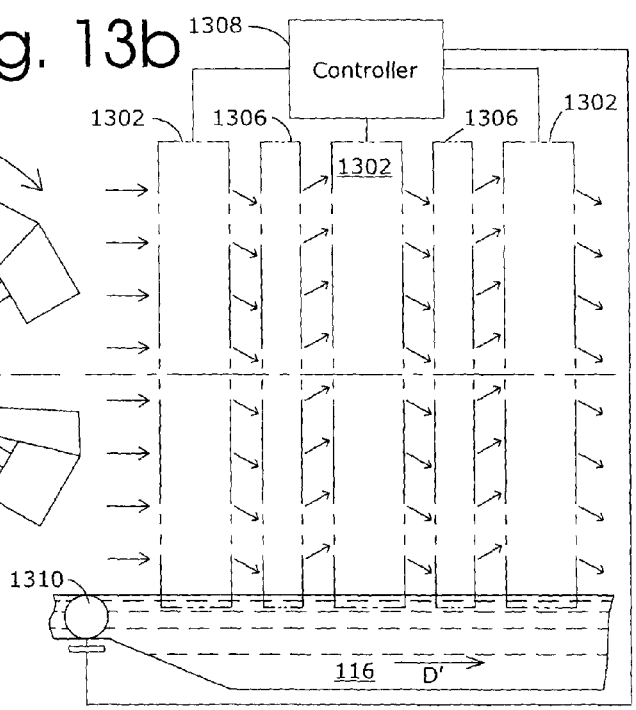

FIGS. 13a-b show a schematic of a multi-stage engine according to another embodiment. FIG. 13a shows an engine stage from the front. FIG. 13b shows the multiple stages from the side in phantom line for clarity. In this embodiment, the liquid heat source 116 flows generally in a direction D' that is perpendicular to the flow direction D of FIG. 1, such that each subsequent stage of the multi-stage engine can be configured to capture the heat that was not captured by the previous stage.

Each engine stage 1302 can have the same or similar components as discussed above for the engine 100, with the controller 1308 controlling all engine stages. Each engine stage 1302 can be connected to a common shaft or to multiple shafts as also discussed, for example, in WO 2009/140752, which is included herein by reference. One addition in this embodiment is that a plurality of vanes 1304 is fixed to each engine stage 1302. In this embodiment, each vane 1304 is secured to a vessel 106 and a conduit 108. Each of the vanes 1304 can be similar to a fan blade or the like. As an engine stage 1302 rotates, the vanes 1304 induce convective air currents around the vessels 106 to enhance the cooling of the vessels 106. Each subsequent engine stage 1302 can cumulatively increase the air movement and thus the convective cooling effect on the vessels 106. Stators 1306, that is stationary assemblies of vanes, can be provided between the engine stages 1302 to add additional turbulence and thus cooling properties to the air flow (which is generally indicated by arrows).

The controller 1308 controls each engine stage 1302 in a manner similar to control of the engine 100 described above. The programs for each engine stage 1302 can be interrelated, so that if one engine stage 1302 is running faster than expected or desired, the speeds of the other engine stages 1302 are automatically adjusted. The speed, direction of rotation, and/or torque of each engine 1302 stage can be controlled by the controller 1308 independently of the other engine stages 1302.

In this embodiment, the controller 1308 also controls a valve 1310 that regulates the flow of the heat source 116. The valve 1310 can be a controllable gate valve or similar device. The program of the controller 1308 can be configured to adjust the flow rate of the heat source 116 to adjust the output of the multi-stage engine. The valve 1310 can include a temperature sensor and flow meter having outputs fed back to the controller 1308 so that the controller 1308 can, for example, determine how much energy is entering the system. One way to stop the multi-stage engine is for the controller 1308 to turn off the valve 1310 completely.

Figure 14:
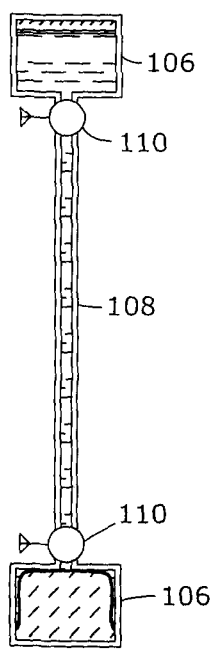
FIG. 14 is a cross-sectional diagram of an isolated conduit and vessel pair according to another embodiment.

FIG. 14 shows an isolated conduit and connected vessel pair, according to another embodiment. This embodiment is similar to that shown in FIGS. 2a-b, with the main difference being that two valves 110 are provided at either end of the conduit 108. Both of the valves 110 are independently controllable by the controller 150.

Figure 15:
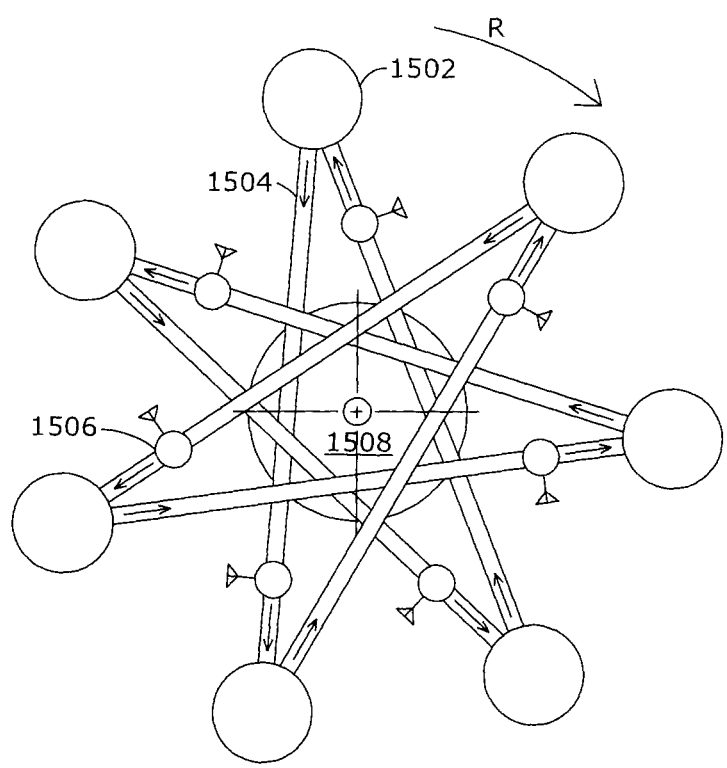
FIG. 15 is a schematic view of a vessel, conduit, and valve arrangement of an engine according to another embodiment.

FIG. 15 shows a vessel, conduit, and valve arrangement of an engine according to another embodiment. The vessel, conduit, and valve arrangement can be used with the other embodiments described herein, such as that of FIG. 1.

Vessels 1502 are connected by conduits 1504. Vessels 1502 and conduits 1504 can be designed as described elsewhere herein. One difference, however, is that each vessel 1502 has an inlet conduit and an outlet conduit, so that mass (e.g., liquid) is propelled in a continuous circuit, going from each vessel 1502 to each conduit 1504 in turn, as indicated by the arrows and as also described in the WO publication mentioned above. Each conduit 1504 is given a controllable valve 1506, such as those described elsewhere herein. For a given vessel 1502, the opening/closing of the valves 1506 of the inlet and outlet conduits 1504 can be synchronized, so that mass is directed into the correct target vessel 1502. The valves 1506 can be controlled by the controller 150. A membrane or piston structure may be used to isolate the volatile material from the mass, the vessel 1502 being constructed like that in FIG. 7, for instance, but with two conduits connected to the vessel instead of one. Spherical vessels as depicted may be substituted with cylindrical vessels when pistons are used. The assembly of vessels 1502 and conduits 1504 rotates about a hub 1508 to which the conduits 1504 are secured to generate power (as indicated by the arrow).

FIG. 16 shows a variation of the vessel shown in FIG. 9. A membrane 1602 is provided to further isolate the upper chamber 904 from the lower chamber 906. The membrane 1602 is held in place by a snap ring 1604 and mating groove on the inside of the vessel wall. When the piston 908 moves upwards, the membrane 1602 tends to collapse and reduce the volume of the upper chamber 904. When the piston 908 moves downwards, the membrane 1602 tends to unfurl and increase the volume of the upper chamber 904. The space between the membrane 1602 and the seal 910 can be vented.

FIG. 17 shows another variation of the vessel shown in FIG. 9. The seal is omitted and a flexible bellows 1702 is provided to isolate the upper chamber 904 from the lower chamber 906. The flexible bellows 1702 can be made of thin metal and behaves in a spring-like manner, expanding and contracting with movement of the piston 908.

Figure 18:
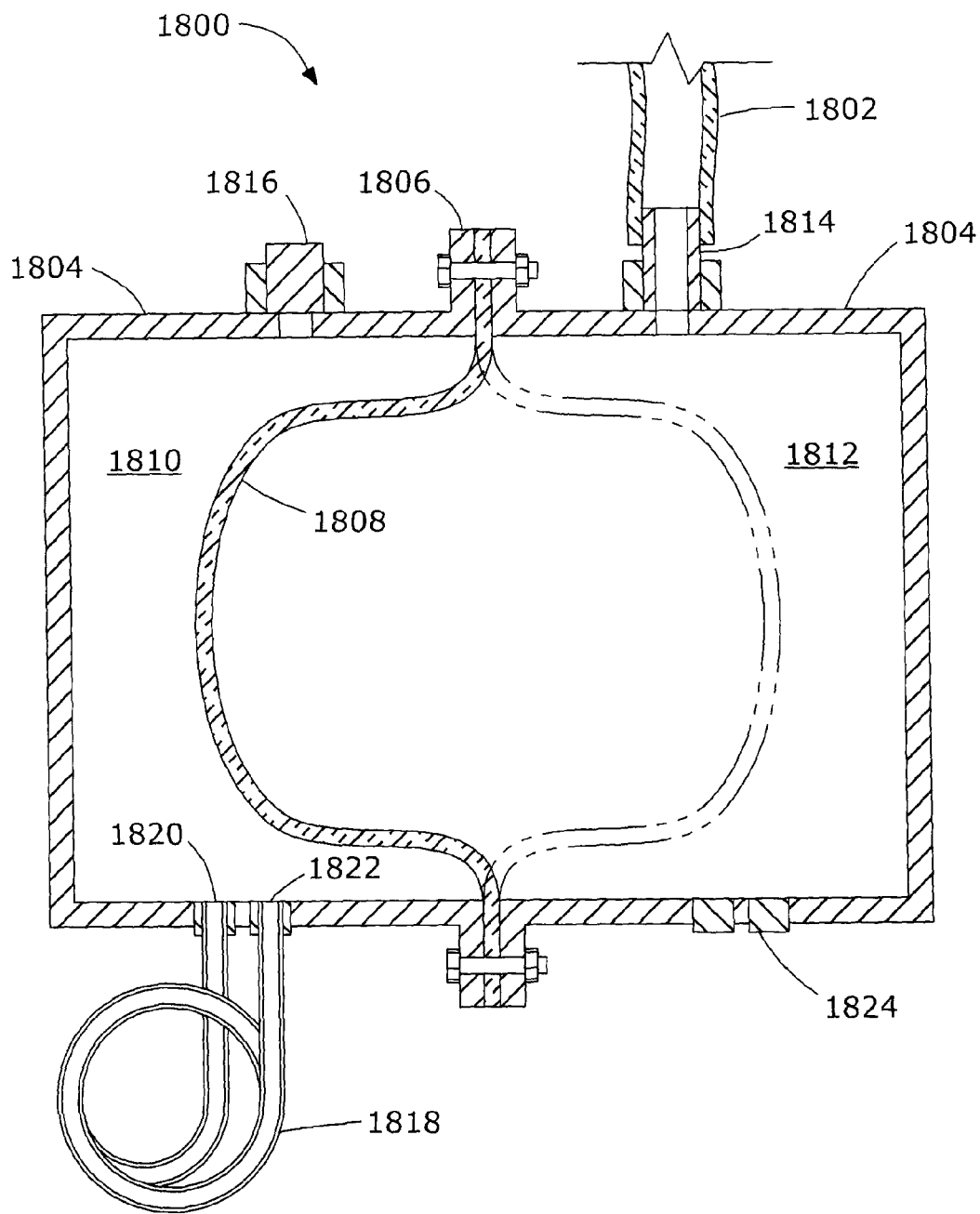
FIG. 18 is a cross-sectional view of a vessel and a portion of the connected conduit according to another embodiment.

FIG. 18 shows a close up view of a vessel 1800 and a portion of a connected conduit 1802, according to another embodiment.

The vessel 1800 includes two halves 1804 fixed together by, for example, bolting flanges 1806. The flanges 1806 also sandwich a flexible membrane 1808 that separates the interior of the vessel 1800 into two chambers 1810 and 1812. In the vessel orientation depicted, the chambers 1810 and 1812 are side by side. The vessel halves 1804 can be of the same shape and dimensions, and can be manufactured identically. The vessel halves 1804 can be made of thermally insulative material, such as a plastic (e.g., polypropylene). Using thermally insulative material for the vessels halves 1804 can reduce heat transfer between the vessel contents and the environment.

The flexible membrane 1808 can be made of a material such as polyethylene or polypropylene film, silicone rubber, polymer coated or impregnated fabric, or other material, such as those described elsewhere herein. The flexible membrane 1808 is deformable, but need not be elastic or resilient. However, in other embodiments, the membrane can be elastic or resilient. The material of the flexible membrane 1808 can be chosen to be thermally insulative, which can assist in preventing heat transfer between the contents of the chambers 1810 and 1812.

The conduit 1802 is connected to one of the vessel halves 1804 using a coupling 1814 and is in communication with the chamber 1812. In this embodiment, the conduit 1802 is made of tubing or hose and can be held to the coupling 1814 mechanically (e.g., using a hose clamp) or chemically (e.g., using an adhesive or cement). The coupling 1814 can be secured into a port of the wall of the vessel half 1804 by threading or other technique. The same port in the other vessel half 1804 can be plugged by a threaded plug 1816 or similar.

The vessel half 1804 defining the chamber 1810 has one or more coils 1818 protruding therefrom. The coil 1818 had two ends 1820 and 1822, each of which is connected to ports in the wall of the vessel half 1804. The interior of the coil 1818 is in communication with the chamber 1810. The coil 1818 can be made of a thermally conductive material, such as copper, other metal, or another material that allows for quick heat transfer between the volatile fluid within the coil 1818 and an external heating or cooling source. The coil 1818 can have one or more windings, which can be circular (as shown) or can follow another path (e.g., zigzagging). The cross-sectional shape of coil 1818 can be round, rectangular, or other shape. The coil ports in the vessel half 1804 having the conduit 1802 connected can be plugged by plugs 1824 or similar.

Volatile fluid is disposed inside the chamber 1810, but does not need to fill the chamber 1810. Mass, such as water, is disposed inside the chamber 1812. Referring to FIGS. 2*a-b*, when the vessel 1800 moves near the heat source 116, volatile fluid that has been collecting in the coil 1818 (due to gravity and/or condensation from previous cooling) at least partially vaporises. The vaporization of the volatile fluid tends to increase the pressure in the chamber 1810, which causes the membrane 1808 to deform (shown as phantom lines in FIG. 18) and push the mass in the chamber 1812 out the conduit 1802 and into the chamber 1812 of a connected vessel 1800. One can appreciate that the coil 1818 of the connected vessel 1800 can be cooled at the same time, thereby creating a partial vacuum effect that further tends to pull the mass into the chamber 1812 of the connected vessel 1800.

Figure 19:
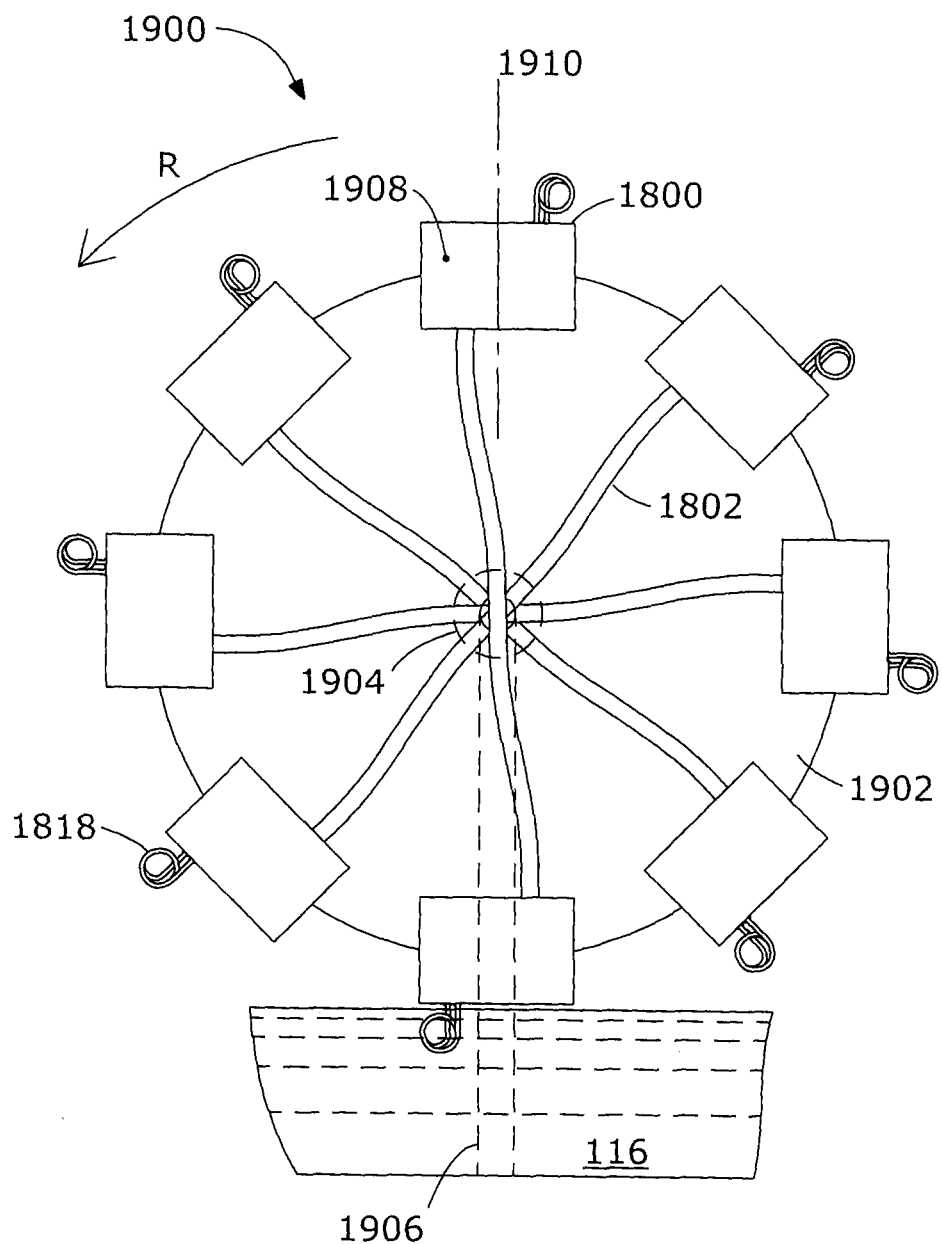
FIG. 19 is a schematic diagram of an engine using the vessels of FIG. 18.

FIG. 19 shows a schematic diagram of an engine 1900 using the vessels 1800. Eight vessels 1800 are fixed to a frame 1902 and interconnected by conduits 1802. The vessels 1800 are arranged on the frame 1902 about a central shaft 1904, which is attached to the frame 1902. The frame 1902 can be a disc as shown, or can have other structure, such as a frame made out of structural members or rigid tubing. The shaft 1904 is rotatably supported by a support 1906, which can be secured to a foundation. The shaft 1904, frame 1902, vessels 1800, and conduits 1802 can thereby rotate as a unit about the center of the shaft 1904 as indicated by arrow R.

Each vessel 1800 is connected to a vessel 1800 opposite via one of the conduits 1802. In this embodiment, the eight vessels 1800 are evenly spaced about the shaft at 45 degrees. The vessels 1800 are radially positioned on the frame 1902 at a position that allows the protruding coils 1818 to encounter the heat source 116. In this example, the heat source 116 is warm water and the coils 1818 dip into the warm water.

The rotation of the engine 1900 follows the same principles as described elsewhere herein. In addition, since the vessel chambers 1810 and 1812 are side by side, mass enters the topmost vessel 1800 to one side (e.g., the left side at 1908) of the center 1910 of the engine 1900. And because the weight of the volatile fluid in the chamber 1810 and coil 1818 is relatively small, the arriving off-center mass (at 1908) causes an additional gravitational moment that further tends to rotate the engine 1900 in the direction R.

Figure 20:
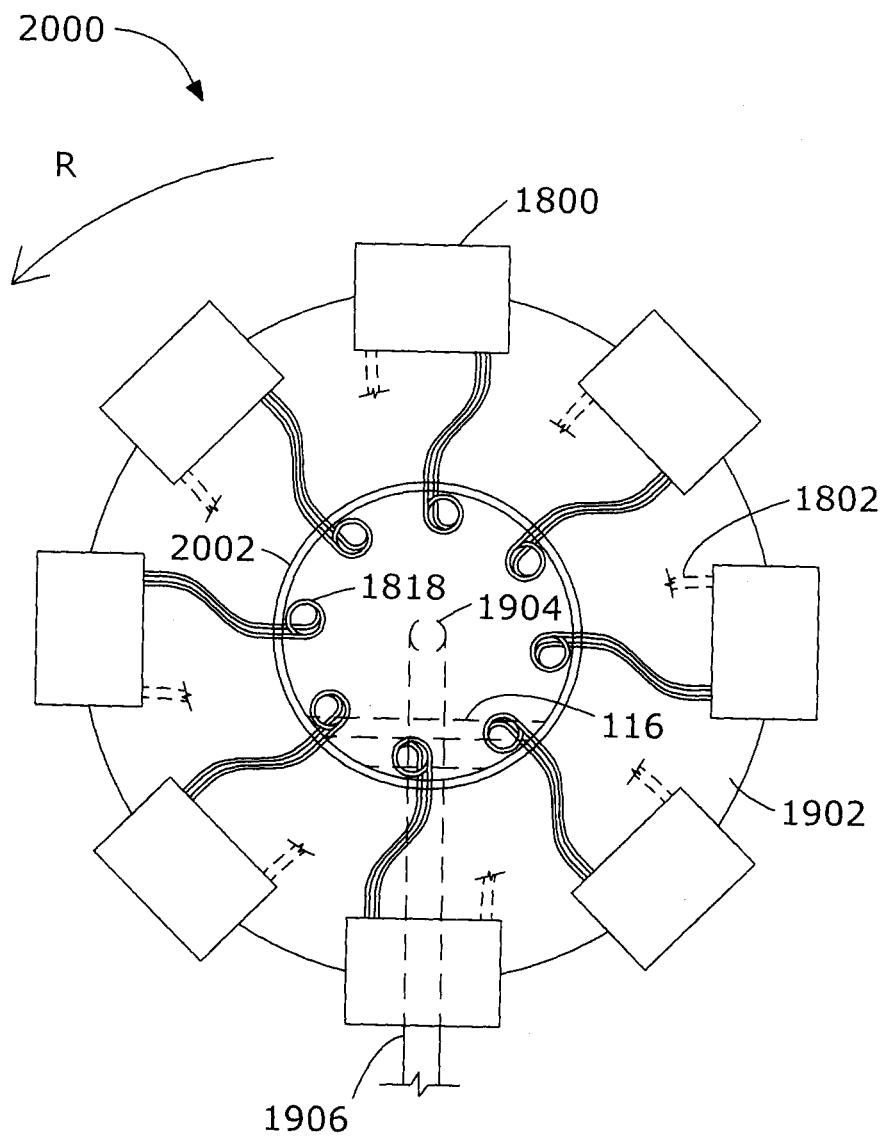
FIG. 20 is a schematic diagram of an engine using the vessels of FIG. 18 according to another embodiment.

FIG. 20 shows a schematic diagram of an engine 2000 using the vessels 1800 according to another embodiment. As in the embodiment of FIG. 19, the conduits 1802 connect opposite vessels 1800; however, the entire lengths of the conduits 1802 have not been depicted for clarity.

In this embodiment, the coils 1818 are routed into a central pipe 2002, which is fixed to and runs through the frame 1902.

The pipe 2002 contains the heat source 116, which in this example is warm water that flows the length of the pipe (the direction into the page). The level of warm water in the pipe 2002 is predetermined to allow one or more of the coils 1818 to be immersed in the warm water while other coils 1818 are allowed to cool outside the warm water. Where the leads of the coils 1818 extend through the wall of the pipe 2002 is made waterproof by sealant or mechanical fixture.

The shaft 1904 runs through the pipe 2002 and is rotatably supported at each end by support 1906. The entire assembly of frame 1902, shaft 1904, vessels 1800, conduits 1802, and pipe 2002 therefore rotate as a unit in the direction R. The heat source 116, being a liquid, approximates its natural level due to gravity despite rotation of the pipe 2002. Other operational principles of the engine 2000 are similar to those described elsewhere herein.

In addition to those sensors described elsewhere herein, other sensors can be included and coupled to the controller for further monitoring and/or control of the engine. Such other sensors include sensors to measure conditions of the heat sink (e.g., an ambient temperature sensor), position sensors for determining the positions of the membranes, sight-glasses on the vessels for observing the mass and/or volatile material, and accelerometers or strain gauges to measure vibration and/or stress of various engine components for safety.

Figure 21:
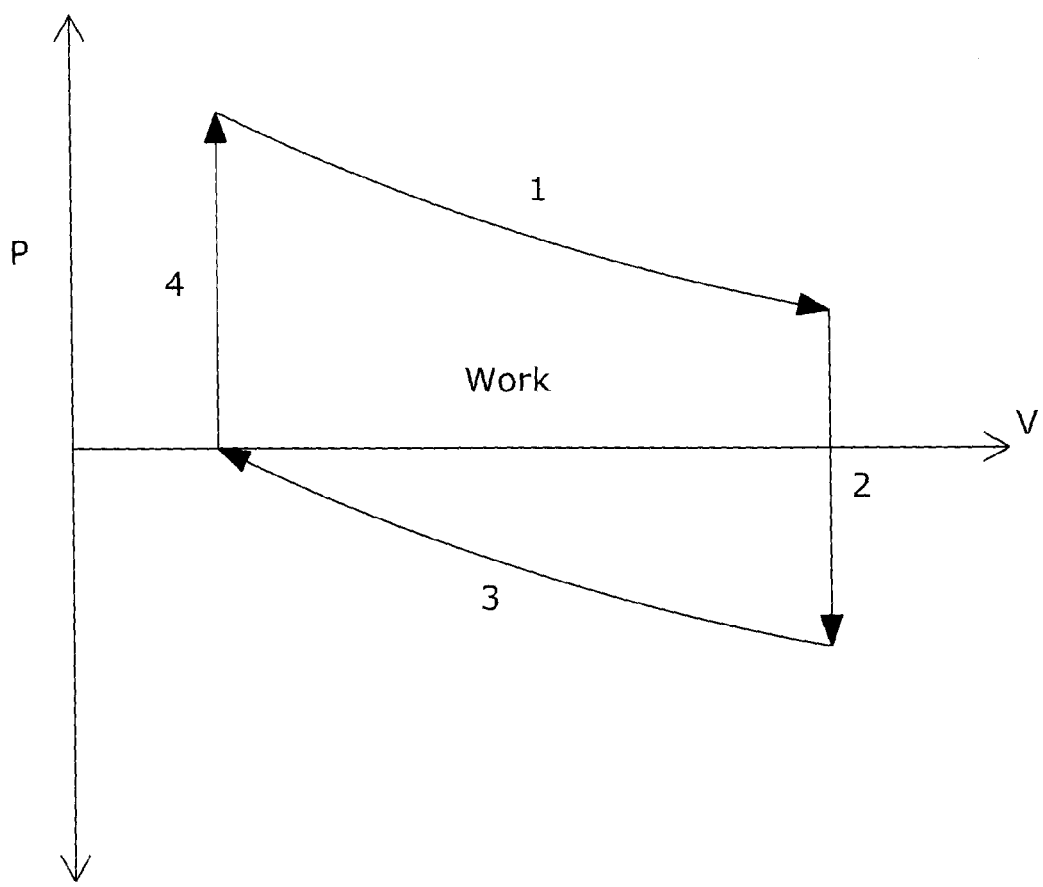
FIG. 21 is a P-V diagram of an idealized thermodynamic cycle to aid understanding of embodiments of this disclosure.

FIG. 21 is a P-V diagram of an idealized thermodynamic cycle to aid understanding of embodiments of this disclosure. The horizontal axis is volume, while the vertical axis is pressure.

At portion 4 of the cycle, a vessel's volatile fluid is heated by the heat source (heat in). At portion 1, the volatile fluid expands and drives the mass against gravity into a higher vessel (work out). At portion 2, the volatile fluid is cooled (heat out). And at portion 3, the volatile fluid condenses and assists pulling the mass upwards (work out). Unlike other cycles where work input is required at portion 3 (e.g., Rankine or Stirling), the cycle shown in FIG. 21 can create work at portion 3 due to the relative vacuum in the vessel generated during cooling. The relative vacuum, or "negative compression", is equivalent to an expansion and can therefore be counted towards the net work output.

Thus, in an aspect, there is provided an engine configured to extract energy from a heat source, the engine comprising: a shaft adapted to be rotatably coupled to a support and being rotatable in a first direction; a plurality of vessels coupled to and arranged about the shaft, at least a first vessel of the plurality of vessels comprising a thermally insulative portion and a thermally conductive portion; a plurality of conduits connecting the plurality of vessels together, each of the plurality of vessels being in communication with at least one other of the plurality of vessels via at least one of the conduits; the plurality of vessels arranged to allow the thermally conductive portion of the first vessel to encounter the heat source, the thermally conductive portion capable of transferring heat to at least partially vaporize volatile fluid within the first vessel to cause a mass to at least partially move towards a connected vessel located above the first vessel to produce a gravitational moment that encourages rotation of the shaft and the plurality of vessels in the first direction.

In an embodiment, at least the first vessel comprises a separator to separate the volatile fluid from the mass.

In another embodiment, the mass comprises a flowable mass other than a liquid.

In another embodiment, the mass comprises one or more of gels, suspensions, colloids, thixotropic pastes, solids, particulates, sand, and ball bearings.

In another embodiment, the mass comprises solids or particulates, and the flowability of the solids or particulates is aided by the addition of a liquid, a lubricant or a low-friction coating.

In another embodiment, the mass comprises a high-density liquid.

In another embodiment, the high-density liquid comprises one of oils, iodine and mercury.

In another embodiment, the separator comprises a membrane.

In another embodiment, the membrane is elastic or resilient.

In another embodiment, the separator comprises a plurality of membranes.

In another embodiment, the first vessel comprises a vent hole between the membranes.

In another embodiment, the first vessel further comprises a valve at the vent hole.

In another embodiment, the separator comprises a piston.

In another embodiment, the separator comprises a bellows.

In another embodiment, the engine further comprises a valve provided in at least one vessel, the valve configured to allow filling and draining of at least a part of the volatile material in the vessel.

In another embodiment, the valve is configured to adjust a vacuum pressure in the vessel, thereby allowing adjustment of the thermal properties of the volatile material in the vessel in response to at least one of the heat source and ambient conditions.

In another embodiment, the valve is configured to be controllable by a controller to automatically control an amount of volatile material in the vessel.

In another embodiment, the valve is configured to be controllable by a controller to automatically control a condition of volatile material in the vessel.

In another embodiment, the thermally conductive portion comprises a portion of a wall of the first vessel.

In another embodiment, the thermally conductive portion extends from a wall of the first vessel.

In another embodiment, the thermally conductive portion comprises a coil extending from a wall of the first vessel.

In another embodiment, the thermally conductive portion comprises a heat pipe.

In another embodiment, the engine further comprises a sensor provided at the first vessel.

In another embodiment, the sensor is a temperature sensor.

In another embodiment, the sensor is a pressure sensor.

In another embodiment, the engine further comprises a rotational position detector for measuring a rotational position in the first direction of at least the first vessel.

In another embodiment, the engine further comprises a valve coupled between the first vessel and the connected vessel, the valve for restricting movement of the mass.

In another embodiment, the engine further comprises a controller configured to open and close the valve at predetermined angular positions.

In another embodiment, the engine further comprises a controller configured to open and close the valve in dependence upon at least one of the flowability of the mass, the speed at which the volatile material expands upon exposure to the heat source, and the current rotational speed of the engine.

In another embodiment, the engine further comprises a power source for powering the valve.

In another embodiment, the engine further comprises a shroud surrounding the plurality of vessels and the plurality of conduits.

In another embodiment, the engine further comprises a valve at the first vessel or at a conduit connected to the first vessel for filling or draining the mass.

In another embodiment, the engine further comprises a vane rotatable with the first vessel in the first direction.

In another embodiment, the engine further comprises multiple stages of vessels and conduits.

In another embodiment, the engine further comprises a controller configured to control speed, direction of rotation, and/or torque of at least one stage independently of at least another of the stages.

In another embodiment, each of the first vessel and the connected vessel comprises a separator that separates the volatile fluid from the mass, so that when vapour of volatile material in the connected vessel at least partially condenses due to cooling, a partial vacuum acts on the separator of the connected vessel to assist in moving the mass into the connected vessel.

In another embodiment, the engine further comprises a pipe connected to the shaft and rotatable with the shaft, the pipe for containing the heat source, wherein the thermally conductive portion of the at least first vessel comprises a coil extending from a wall of the first vessel and into the pipe.

In another embodiment, the engine further comprises a controller comprising a transceiver adapted to communicate via wired or wireless communications protocols such that the engine can be remotely monitored and controlled.

In another embodiment, the engine further comprises a global positioning system (GPS) device to monitor the location of the engine.

In another embodiment, the engine is mounted to a base structure which is configured to be controllable in order to set at least one of the position or orientation of the engine.

In another embodiment, the engine further comprises an electrical generator for converting some of that rotational energy to electricity to power the power-requiring components of the engine.

In another embodiment, the engine further comprises one or more rechargeable batteries for storing and supplying the electricity to power the power-requiring components of the engine and controller.

While the above description provides examples of one or more methods and/or apparatuses, it will be appreciated that other methods and/or apparatuses may be within the scope of the present description as interpreted by one of skill in the art.

What is claimed is:

1. An engine configured to extract energy from a heat source, the engine comprising:
    a shaft adapted to be rotatably coupled to a support and being rotatable in a first direction;
    a plurality of vessels coupled to and arranged about the shaft, at least a first vessel of the plurality of vessels comprising a thermally insulative material or a thermally insulative portion and a thermally conductive portion, and each of the plurality of vessels including a separator to separate a volatile material from a mass;
    a plurality of conduits connecting the plurality of vessels together, each of the plurality of vessels being in communication with at least one other of the plurality of vessels via at least one of the conduits, the plurality of vessels arranged to allow the thermally conductive portion of the first vessel to encounter a heat source, the thermally conductive portion capable of transferring heat to at least partially vaporize volatile material within the first vessel to cause the mass separated from the volatile material to at least partially move towards a connected vessel located above the first vessel to produce a gravitational moment that encourages rotation of the shaft and the plurality of vessels in the first direction, the volatile material in the connected vessel being cooled by a cooling source;

a pipe connected to the shaft and rotatable with the shaft, the pipe for containing the heat source;

and a valve provided in at least one vessel, the valve configured to allow filling and draining of at least a part of the volatile material in the vessel; wherein the valve is configured to adjust a pressure in the vessel, thereby allowing adjustment of the thermal properties of the volatile material in the vessel in response to at least one of the heat source and ambient conditions.

2. The engine of claim 1, wherein the mass comprises a flowable mass other than a liquid.

3. The engine of claim 2, wherein the mass comprises one or more of gels, suspensions, colloids, thixotropic pastes, solids, particulates, sand, and ball bearings.

4. The engine of claim 2, wherein the mass comprises solids or particulates, and the flowability of the solids or particulates is aided by the addition of a liquid, a lubricant or a low-friction coating.

5. The engine of claim 1, wherein the mass comprises a high-density liquid comprising one of oils, iodine and mercury.

6. The engine of claim 1, wherein the separator comprises a membrane.

7. The engine of claim 6, wherein the membrane is flexible.

8. The engine of claim 1, wherein the separator comprises a plurality of membranes.

9. The engine of claim 8, wherein the first vessel comprises a vent hole between the membranes.

10. The engine of claim 9 further comprising a valve at the vent hole.

11. The engine of claim 1, wherein the separator comprises a piston.

12. The engine of claim 1, wherein the separator comprises a bellows.

13. The engine of claim 1, wherein the valve is configured to be controllable by a controller to automatically control an amount of volatile material in the vessel.

14. The engine of claim 1, wherein the valve is configured to be controllable by a controller to automatically control a condition of volatile material in the vessel.

15. The engine of claim 1, wherein each vessel is internally or externally coated or covered in an insulating material.

16. The engine of claim 1, wherein the thermally conductive portion extends from a wall of the first vessel.

17. The engine of claim 1, wherein the thermally conductive portion comprises a coil extending from a wall of the first vessel.

18. The engine of claim 1, wherein the thermally conductive portion comprises a heat pipe.

19. The engine of claim 1, further comprising a sensor provided at the first vessel.

20. The engine of claim 19, wherein the sensor is a temperature sensor.

21. The engine of claim 19, wherein the sensor is a pressure sensor.

22. The engine of claim 1 further comprising a rotational position detector for measuring a rotational position in the first direction of at least the first vessel.

23. The engine of claim 1 further comprising a valve coupled between the first vessel and the connected vessel, the valve for restricting movement of the mass.

24. The engine of claim 23 further comprising a controller configured to open and close the valve at predetermined angular positions.

25. The engine of claim 23 further comprising a controller configured to open and close the valve in dependence upon at least one of the flowability of the mass, the speed at which the volatile material expands upon exposure to the heat source, and the current rotational speed of the engine.

26. The engine of claim 23 further comprising a power source for powering the valve.

27. The engine of claim 1 further comprising a shroud surrounding the plurality of vessels and the plurality of conduits.

28. The engine of claim 1 further comprising a valve at the first vessel or at a conduit connected to the first vessel for filling or draining the mass.

29. The engine of claim 1 further comprising a vane rotatable with the first vessel in the first direction.

30. The engine of claim 1 further comprising multiple stages of vessels and conduits.

31. The engine of claim 30 further comprising a controller configured to control speed, direction of rotation, and/or torque of at least one stage independently of at least another of the stages.

32. The engine of claim 1, wherein, when vapour of volatile material in the connected vessel at least partially condenses due to cooling, a partial vacuum acts on the separator of the connected vessel to assist in moving the mass into the connected vessel.

33. The engine of claim 1, wherein a coil is protruding from the first vessel and into the pipe that is rotating with the engine containing the heat source.

34. The engine of claim 1, further comprising a controller comprising a transceiver adapted to communicate via wired or wireless communications protocols such that the engine can be remotely monitored and controlled.

35. The engine of claim 1, wherein the engine further comprises a global positioning system (GPS) device to monitor the location of the engine.

36. The engine of claim 1, wherein the engine is mounted to a base structure which is configured to be controllable in order to set at least one of the position or orientation of the engine.

37. The engine of claim 1, wherein the engine further comprises an electrical generator for converting some of that rotational energy to electricity to power one or more power-requiring components of the engine.

38. The engine of claim 37, wherein the engine further comprises one or more rechargeable batteries for storing and supplying the electricity to power the power-requiring components of the engine and controller.

39. The engine of claim 7, wherein the membrane comprises a thermally insulative material.

40. The engine of claim 39, wherein the insulative material comprises one or more of ceramic, fibres, or nodules.

* * * * *